W. M. BALL.
Seed-Planter.

No. 66,934. Patented July 23, 1867.

Witnesses:
F. A. Lehman
John Ellis

Inventor:
Wm M Ball
Per
J. R. Alexander & Co
Attys

United States Patent Office.

WILLIAM M. BALL, OF MORRISTOWN, INDIANA.

Letters Patent No. 66,934, dated July 23, 1867.

---

IMPROVEMENT IN CULTIVATORS.

---

The Schedule referred to in these Letters Patent and making part of the same

---

TO ALL WHOM IT MAY CONCERN:

Be it known that I, WILLIAM M. BALL, of Morristown, State of Indiana, have invented certain new and useful Improvements in Cultivators; and I declare the following to be a full, true, and exact description of the same, reference being had to the accompanying drawings, and to the letters of reference marked thereon.

Figure 1:
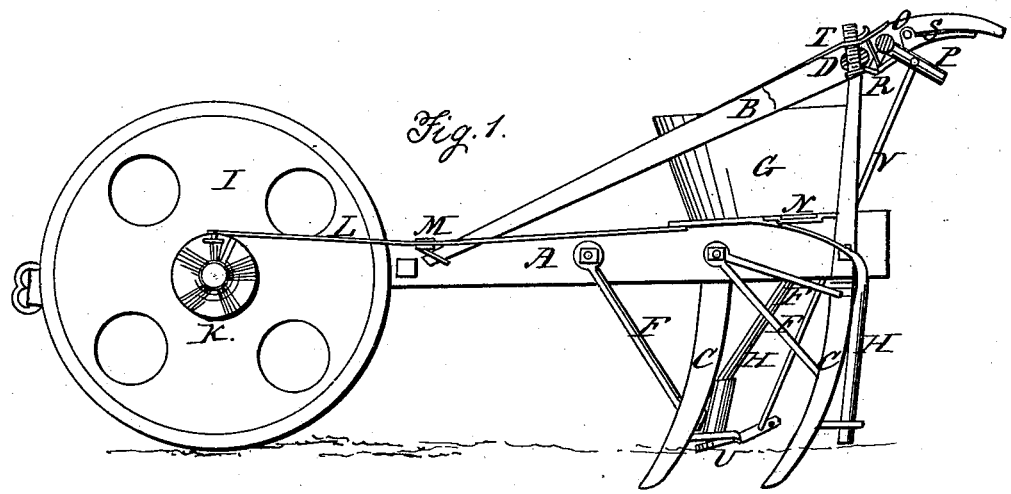
Figure 1 represents a side elevation of my cultivator.
Figure 2:
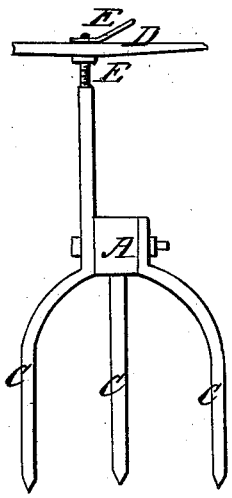
Figure 2 represents an end view of the same, showing the relative position of the three hoes, and the manner in which the handles are lowered and raised.
Figure 3:
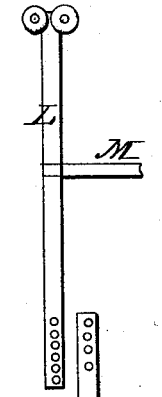
Figure 3 represents the manner in which the shaker-bar is attached to the slide of the seed-box.
Figure 4:
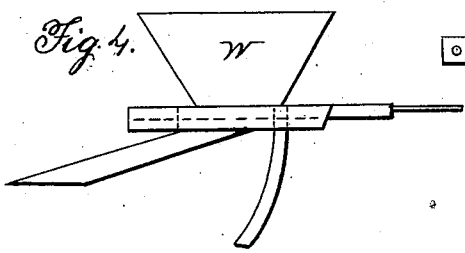
Figure 4 is a side elevation of the second kind of seed-boxes that may be used upon my cultivator.

Letter A represents the main beam of my cultivator, to which the handles B are attached. Letter C represents the ploughs, one of which is fastened to each side of the beam A, while the third passes through its middle, as shown in fig. 2. The left-hand plough is provided with a shank, which extends upwards through the round D, and has a screw-thread cut upon its top, for the purpose of controlling the height of the handles B. Underneath the round D is placed a nut, E, while a second one is placed on its top, and, to render its operation the more easy, is provided with a handle, so that it can be readily moved upon the shank without the aid of a wrench. To raise the handles, turn the top nut E' until it is raised to the required height, as seen in fig. 1, and then by turning the lower nut the handles are raised, until it reaches the upper one, where it is held securely in its place, as seen in fig. 2. It will be seen that this plough and shank are formed from one piece of metal. To give these ploughs greater strength and to hold them more securely in their places, they have been provided with the braces F. Upon the top of the beam A is placed the seed-box G, and is held firmly in its place by means of handles B, which pass over its top and press it against the plough-shank. This box is provided with a suitable number of tubes, H, which convey the grain from the box immediately behind the ploughs so as to fall into the furrows. To the front end of the beam A is attached the driving-wheel I, which has the cam-wheel K fastened to its hub. Letter L represents the shaker-bar, which is provided with two small wheels upon its outer end, as shown in fig. 3, one of which works upon each side of the cam-wheel K. This bar is pivoted to the main beam A by the arm M, in such a manner that it has a free lateral play. This bar L is attached to the slide of the grain-box, as seen in fig. 3, for the purpose of shaking the grain into the tubes H. The flow of grain from the box is regulated by this bar, which is perforated in a number of places, so as to give the slide N a short or a long stroke; and as each hole is intended to represent a certain quantity of grain to the acre, the desired flow is readily obtained. The handles B are provided with two rounds, one being used for the purpose of lowering and raising the handles, while the second is used as a lever to stop the flow of grain from the middle plough C. This round O is provided with two arms, P and R. Attached to the side of the right-hand handle is the lever S, in such a manner that in grasping the handle this lever can be taken hold of at the same time. One end of this lever S is attached to the arm R, which, in its turn, is attached to a small metallic spring, I, for the purpose of keeping the arm in its required position. The end of the tube which is attached to the middle plough C is provided with a movable shoe, U, which is attached to the arm P by means of the rod V. When it is desirable to plant in three furrows at once, the lever S is raised in catching hold of the handle, which operates upon the two arms in such a manner that the tube is opened and the grain flows out. When only two furrows are to be planted, let go of the lever S, when the arm R is drawn back to its position, causing the round O to revolve, which closes the tube and the flow is stopped. Letter W, fig. 4, represents another form of a seed-box, which can be used instead of the one now attached to the cultivator when only one furrow is to be planted at a time.

Having thus described my invention, what I claim, and desire to secure by Letters Patent, is—

The shaker-bar L, operated by the cam K, the slide N, hoes C, tubes H, and seed-box G, all arranged in the manner and for the purpose set forth.

In testimony that I claim the above as my own, I hereby affix my signature in the presence of two witnesses.

WM. M. BALL.

Witnesses:
    J. G. WOLF,
    WALTER BROWN.